(12) United States Patent
Konno et al.

(10) Patent No.: US 7,802,649 B2
(45) Date of Patent: Sep. 28, 2010

(54) STEERING LOCK DEVICE FOR MOTORCYCLE

(75) Inventors: Takeshi Konno, Saitama (JP); Tadashi Onozuka, Saitama (JP); Yoshiaki Takeuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 321 days.

(21) Appl. No.: 11/978,725

(22) Filed: Oct. 30, 2007

(65) Prior Publication Data

US 2008/0156050 A1 Jul. 3, 2008

(30) Foreign Application Priority Data

Dec. 28, 2006 (JP) ............................... 2006-355632

(51) Int. Cl.
*B62H 5/04* (2006.01)
*B62H 5/06* (2006.01)

(52) U.S. Cl. ...................... 180/287; 180/271; 70/186

(58) Field of Classification Search ............... 280/271, 280/272; 180/271, 272, 287, 289; 70/182–186, 70/252

See application file for complete search history.

(56) References Cited

U.S. PATENT DOCUMENTS

| | | | | |
|---|---|---|---|---|
| 548,888 A | * | 10/1895 | Noteman | 70/186 |
| 583,291 A | * | 5/1897 | Miller | 70/182 |
| 2,625,813 A | * | 1/1953 | Hinds | 70/185 |
| 5,723,911 A | * | 3/1998 | Glehr | 340/10.5 |
| 5,790,043 A | * | 8/1998 | Hettich et al. | 340/5.62 |
| 6,034,617 A | * | 3/2000 | Luebke et al. | 340/5.62 |
| 6,237,710 B1 | * | 5/2001 | Mori et al. | 180/219 |
| 6,396,412 B1 | * | 5/2002 | Banas | 340/5.2 |
| 6,577,226 B1 | * | 6/2003 | Steiner | 340/5.62 |
| 6,734,578 B2 | * | 5/2004 | Konno et al. | 307/10.2 |
| 2005/0081580 A1 | * | 4/2005 | Nakai et al. | 70/186 |
| 2005/0253461 A1 | * | 11/2005 | Konno | 307/10.5 |
| 2006/0022793 A1 | * | 2/2006 | Konno et al. | 340/5.6 |

FOREIGN PATENT DOCUMENTS

| | | | |
|---|---|---|---|
| CN | 1169929 A | | 1/1998 |
| DE | 3626441 C1 | * | 9/1987 |
| DE | 4343339 A1 | * | 7/1994 |
| JP | 59-87393 U | | 6/1984 |
| JP | 2002-205670 A | | 7/2002 |
| JP | 2002-240759 A | | 8/2002 |
| JP | 2002-345777 A | | 12/2002 |
| JP | 2004-268686 A | | 9/2004 |

* cited by examiner

*Primary Examiner*—Lesley Morris
*Assistant Examiner*—Wesley Potter
(74) *Attorney, Agent, or Firm*—Birch, Stewart, Kolasch & Birch, LLP (57) ABSTRACT

A steering lock device has a steering catch mechanism including a handlebar attached to a steering stem, and a locking arm attached to this handlebar and being equipped with a lock pin for engagement on the tip end portion thereof. The steering catch mechanism also includes a locking claw as an engaging portion that is engagable with the lock pin. The locking claw is usually biased in the unlocking direction. In this catch mechanism, the locking claw is disposed on a rotation track of the lock pin. Accordingly, when an external force is applied to the lock pin such that the lock pin is in contact with the locking claw of the catch mechanism, the locking claw is moved in the locking direction so that the locking claw can be engaged with the lock pin. Therefore, a steering-lock standby state is accomplished.

25 Claims, 11 Drawing Sheets

[STEERING LOCK CONTROL]

FIG. 12

[STEERING-LOCK RELEASING DETERMINATION]

FIG. 13

STEERING LOCK DEVICE FOR MOTORCYCLE

CROSS-REFERENCE TO RELATED APPLICATIONS

This nonprovisional application claims priority under 35 U.S.C. §119(a) on Patent Application No. 2006-355632, filed in Japan on Dec. 28, 2006, the entirety of which is incorporated herein by reference.

BACKGROUND OF THE INVENTION

1. Field of the Invention

The present invention relates to improvements of a steering lock device for a motorcycle.

2. Background of the Invention

In a conventional steering lock device for a motorcycle, the steering is locked by engaging a lock bar to an engaging hole provided on the handlebar side. The lock bar is provided advanceably and retreatably on the vehicle-body side.

For example, Japanese Patent Application Laid-open Publication No. 2004-268686 in FIG. 1 discloses that in a steering lock device, a lock bar 2 is attached to a steering lock device body 1 provided on the vehicle-body side, so as to be moved by a motor M in the fore and aft directions. The steering can be locked by inserting this lock bar 2 into an engaging hole a provided in a steering stem S1, which is the rotating axis of the handlebar.

However, in order to use the above mentioned steering lock device in locking the steering, it needs an accurate alignment between the lock bar 2 and the engaging hole a of the steering stem S1.

Moreover, the attachment position of the steering lock device body 1 to the vehicle-body side has to be determined so as to meet the position of the engaging hole a. For this purpose, the attachment position needs to be controlled accurately in both of the axial direction of the steering stem S, and the direction perpendicular to the steering stem S1. This increases the manufacturing costs.

SUMMARY OF THE INVENTION

Accordingly, it is an object of the present invention to provide a steering lock device for a motorcycle that is capable of locking the steering more easily, with lower cost.

To achieve the above-mentioned object, according to a first aspect of the present invention, a steering lock device is provided with a steering catch mechanism. The steering catch mechanism includes: a steering handlebar attached to a steering stem; a locking arm attached to this steering handlebar and being equipped with a pin for engagement on the tip end portion thereof; and an engaging portion, which is engagable with the pin and is usually biased in the unlocking direction. In this steering catch mechanism, the engaging portion is disposed on the rotation track of the pin. Accordingly, when external force is applied by the pin that is brought into contact with the engaging portion of the steering catch mechanism, the engaging portion is moved in the locking direction. As a consequence, a steering-lock stand-by state is accomplished. In the steering-lock stand-by state, the engaging portion can be engaged with the pin. When steering the steering handlebar, the pin provided on the tip end portion of the steering locking arm is rotated to contact the engaging portion biased in the unlocking direction of the steering catch mechanism. As a result, external force is applied to the engaging portion, which is then moved in the locking direction. Hence, the steering-lock stand-by state is accomplished. In the steering-lock stand-by state, the engaging portion is engagable with the pin. Thereafter, when the movement of the engaging portion in the unlocking direction is blocked, the pin is engaged with the engagement portion to lock the steering. With this structure, what the rider has to do to make the motorcycle in a steering-lock stand-by state is merely steering the handlebar to the steerable maximum extent. The rider thus can lock the steering with an easy operation. Moreover, the attachment position of the catch mechanism needs to be controlled accurately only in the radial direction of the rotation track of the pin. The positioning control in the axial direction of the pin, however, does not require a comparable accuracy. Accordingly, the steering lock device can be developed with lower cost.

Furthermore, according to a second aspect of the present invention, the steering locking arm is attached so as to extend outwards to the steering stem, which supports the steering handlebar. The steering locking arm is allowed to extend linearly. The total length of the steering locking arm can be shortened. Therefore, the steering catch mechanism can have a narrower mounting tolerance, which is related to the total length of the steering locking arm.

Furthermore, according to a third aspect of the present invention, the steering catch mechanism includes an unlocking mechanism, and the steering lock device includes a control unit. The unlocking mechanism is configured to release the engagement of the pin and the engaging portion. The control unit performs an identity verification process for releasing the steering lock with the portable key carried by the rider. According to the verification result, the control unit causes the unlocking mechanism provided to the steering catch mechanism, to perform a releasing operation for the engagement of the pin and the engaging portion. By employing this structure, the control unit can perform the identity verification process and can release the steering lock easily. For example, the rider does not have to carry out any operation for releasing the steering lock.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described in detail with reference to the accompanying drawings, wherein the same reference numerals will be used to identify the same or similar elements throughout the several views. It should be noted that the drawings should be viewed in the direction of orientation of the reference numerals.

Figure 1:
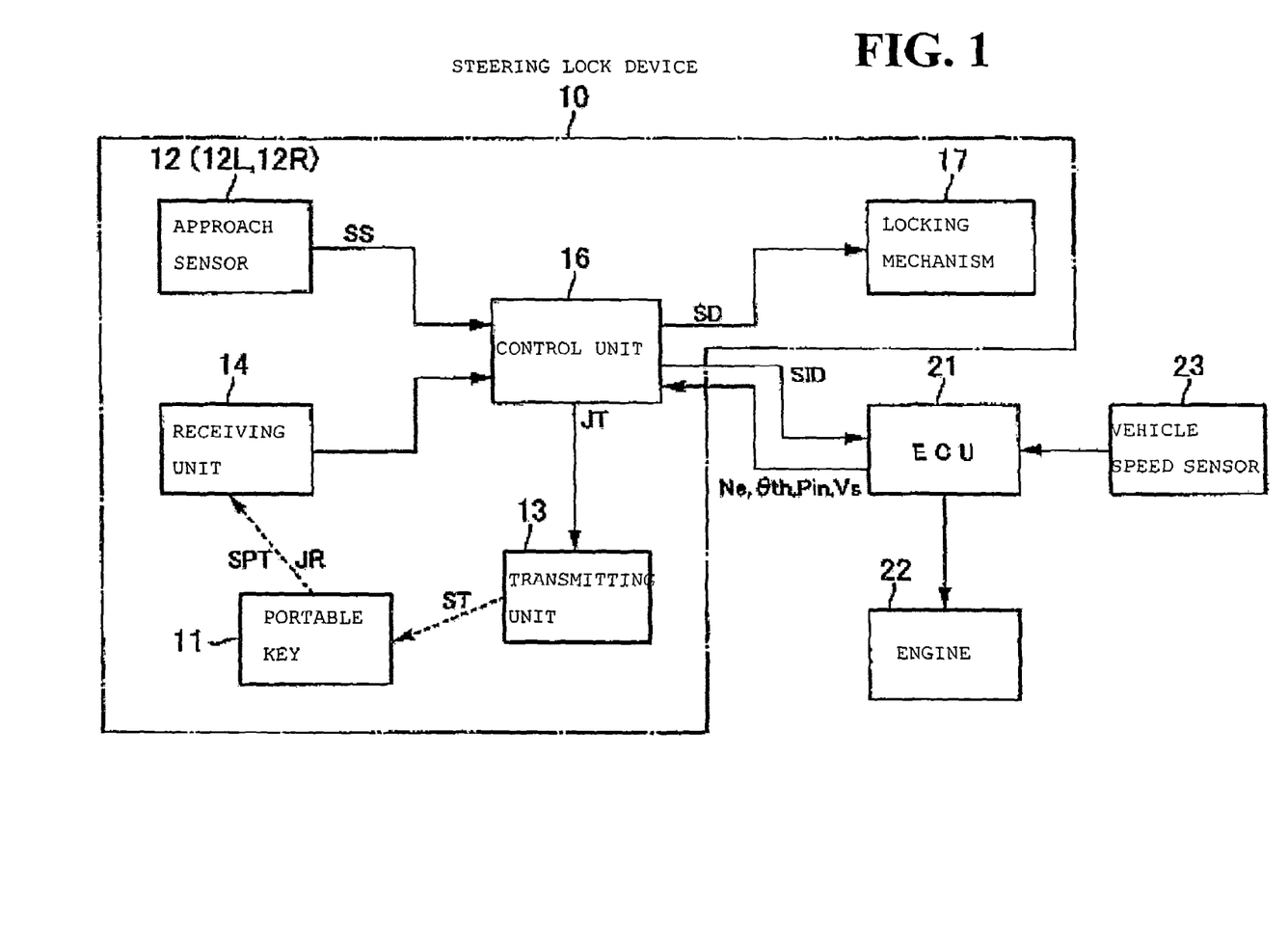
FIG. 1 is a block diagram showing a steering lock device of a motorcycle according to an embodiment of the present invention.

FIG. 1 is a block diagram of a steering lock device according to an embodiment of the present invention. A steering lock device 10 includes a portable key 11, an approach sensor 12 (12R, 12L), a transmitting unit 13, a receiving unit 14, a control unit 16, and a locking mechanism 17. A rider carries the portable key 11. The approach sensor 12 detects the approaching of the portable key 11 held in the rider's hand when the rider enters an area within a predetermined distance from the sensor. The transmitting unit 13 transmits a transmission signal ST to the portable key 11, and the receiving unit 14 receives a portable transmission signal SPT from the portable key 11. Moreover, the control unit 16 transmits transmission information JT to the portable key 11 via the transmitting unit 13 in response to a detection signal SS from the approach sensor 12, as well as receiving reception information JR from the mobile key 11 via the receiving unit 14. Furthermore, the locking mechanism 17 is configured to fix a handlebar to a predetermined position (to lock the steering), or to release the handlebar having been fixed to the predetermined position (to release the steering lock) upon receipt of a drive signal SD from the control unit 16.

The control unit 16 communicates with the portable key 11 via the transmitting unit 13 and the receiving unit 14 (the communications are referred to as "smart communication" in this embodiment), to perform a verification process for checking whether the portable key 11 corresponds to the motorcycle. The control unit 16 also transmits an identification signal SID to an engine control unit (ECU) 21, in order to control the operation of an ignition device and a fuel injection device provided in an engine 22. Additionally, the control unit 16 receives information such as an engine revolution speed Ne, a throttle position θth, an intake-manifold air pressure Pin, and a vehicle speed Vs detected by a vehicle-speed sensor 23.

Figure 2:
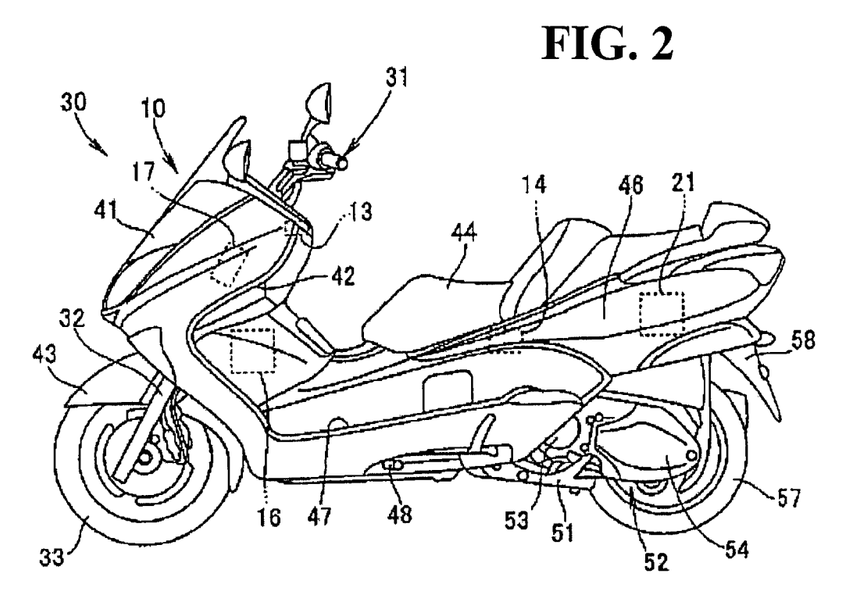
FIG. 2 is a side view of a motorcycle provided with the steering lock device according to an embodiment of the present invention.

FIG. 2 is a side view of a motorcycle provided with the steering lock device according to an embodiment of the present invention. A motorcycle 30 is a vehicle equipped with the anti-theft steering lock device 10 with the steering mechanism for a front wheel 33. The rider steers the front wheel 33 via a front fork 32 by operating a handlebar 31.

FIG. 2 also shows a front cover 41, a leg shield 42, a front fender 43, a dual seat 44, a side cover 46, a floor step 47, a side stand 48, a main stand 51, a power unit 52, an engine 53, a continuously variable transmission 54, a rear wheel 57, and a rear fender 58. The engine 53 and the continuously variable transmission 54 constitute the power unit 52.

The approach sensor 12 (not shown in FIG. 2), the transmitting unit 13, the receiving unit 14, the control unit 16 and the locking mechanism 17 are parts of the steering lock device 10, and are disposed in respective parts of the vehicle body. The transmitting unit 13, the control unit 16 and the locking mechanism 17 are disposed in a vicinity of the leg shield 42, while the receiving unit 14 is disposed under the front portion of the dual seat 44. Disposition of the approach sensor 12 will be explained with reference to FIG. 3. The ECU 21 is disposed inside the side cover 46.

Figure 3:
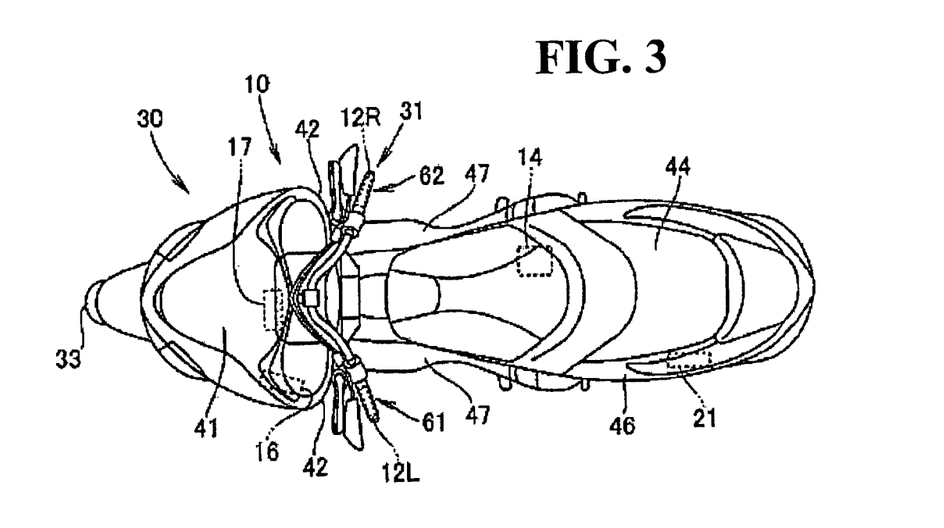
FIG. 3 is a plan view of the motorcycle provided with the steering lock device according to an embodiment of the present invention.

FIG. 3 is a plan view of the motorcycle provided equipped with the steering lock device according to an embodiment of the present invention. A bar-type handlebar 31 is provided with a left grip 61 and a right grip 62 on their respective ends. Approach sensors 12 (12R, 12L) are installed respectively in the grips 61 and 62. The structure of the lock mechanism 17 will be explained in detail with reference to FIGS. 9 and 10. The right grip 62 is a throttle grip for opening and closing a throttle valve of an intake system provided in the engine 53 (see FIG. 2).

Figure 4:
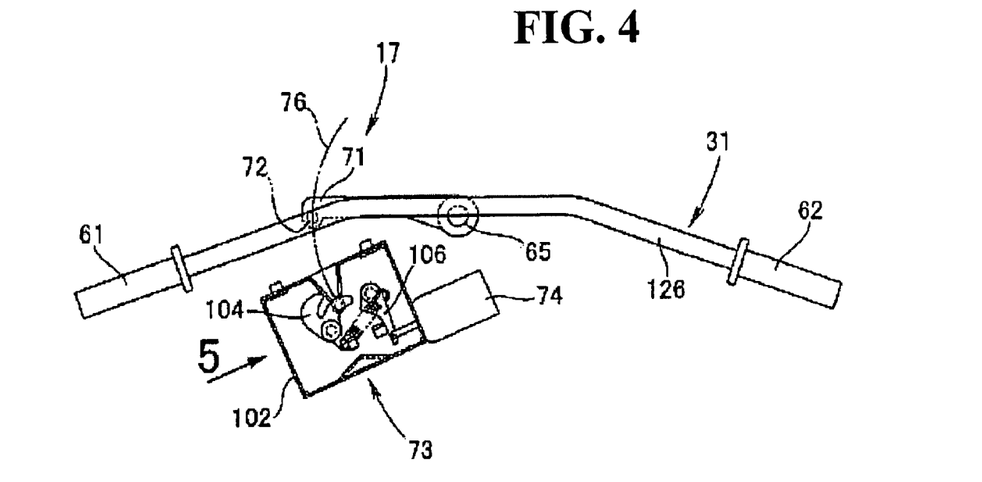
FIG. 4 is an explanatory view showing a locking mechanism of the steering lock device according to an embodiment of the present invention.

FIG. 4 is an explanatory view of the locking mechanism of the steering lock device according to an embodiment of the present invention. The locking mechanism 17 includes a locking arm 71 attached to a steering stem 65 that supports the handlebar 31. The locking arm 71 extends under the handlebar 31 in the longitudinal direction of the handlebar 31. A lock pin 72 is provided on the tip of the locking arm 71. The locking mechanism 17 also includes a catch mechanism 73. When the handlebar 31 is steered in the left direction to the steerable maximum extent, the catch mechanism 73 is positioned so as to be coupled with the lock pin 72. In addition, the locking mechanism 17 includes an actuator 74. The actuator 74 is installed in the catch mechanism 73, and releases the coupling between the lock pin 72 and the catch mechanism 73. FIG. 4 also shows a rotation track 76 on which the lock pin 72 travels when the handlebar 31 is steered.

Figure 5:
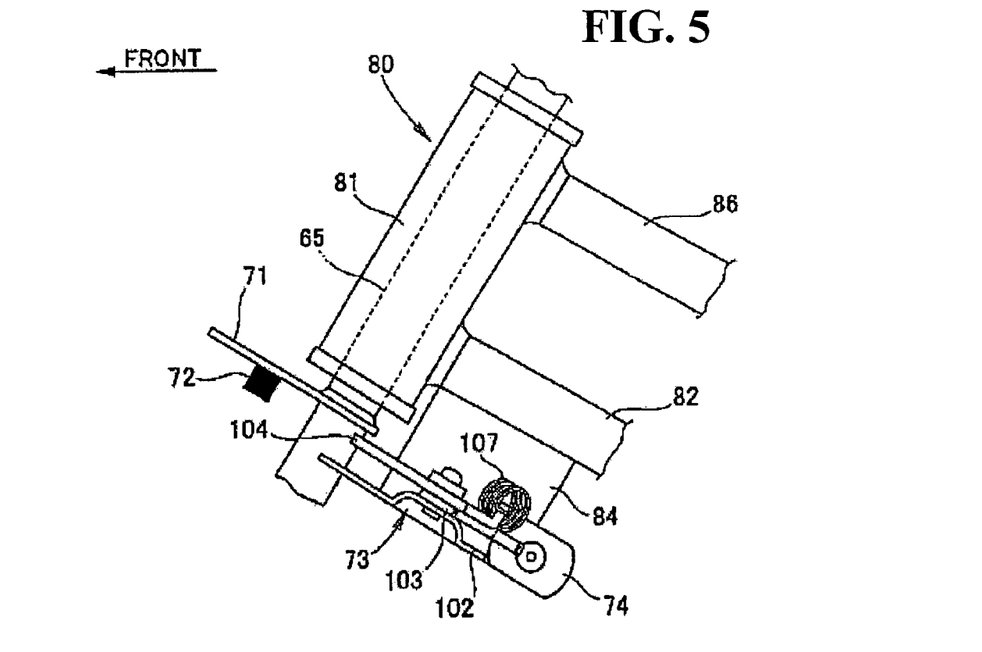
FIG. 5 is a side view showing an attached state of the locking mechanism according to an embodiment of the present invention.

FIG. 5 is a side view showing the attached state of the locking mechanism according to an embodiment of the present invention (the arrow FRONT in the FIG. 5 indicates the front direction of the vehicle). The steering stem 65 is attached rotatably to a head pipe 81, which constitutes the front end portion of a vehicle body frame 80. The locking arm 71 is attached onto this steering stem 65 in a lower position than the head pipe 81. A down tube 82 extends from the head pipe 81 obliquely downward to the rear. To the lower side of the down tube 82, the catch mechanism 73 and the actuator 74 are attached with a bracket 84 placed in between. FIG. 5 also shows a main frame 86, which extends from the head pipe 81 obliquely downward to the rear. The main frame 86 and the down tube 82 are components of the vehicle frame 80.

Figure 6A:
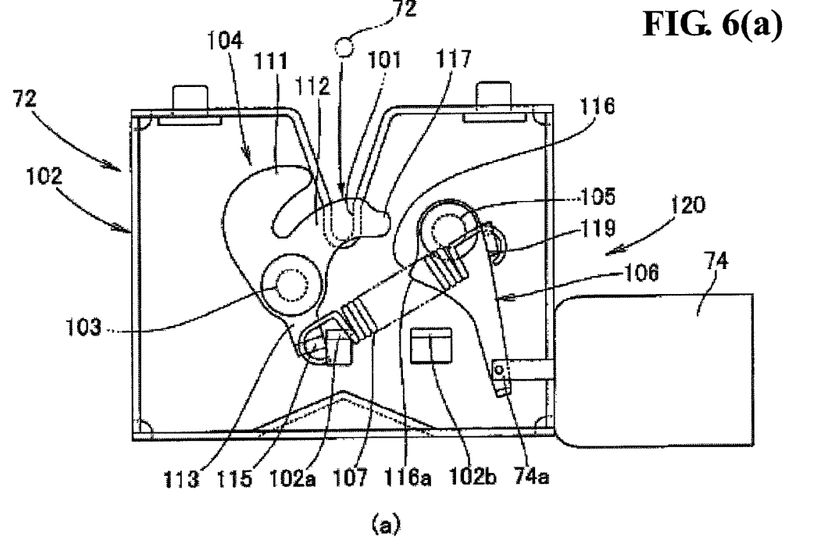
FIGS. 6A and 6B are front views of a catch mechanism according to an embodiment of the present invention.
Figure 6B:
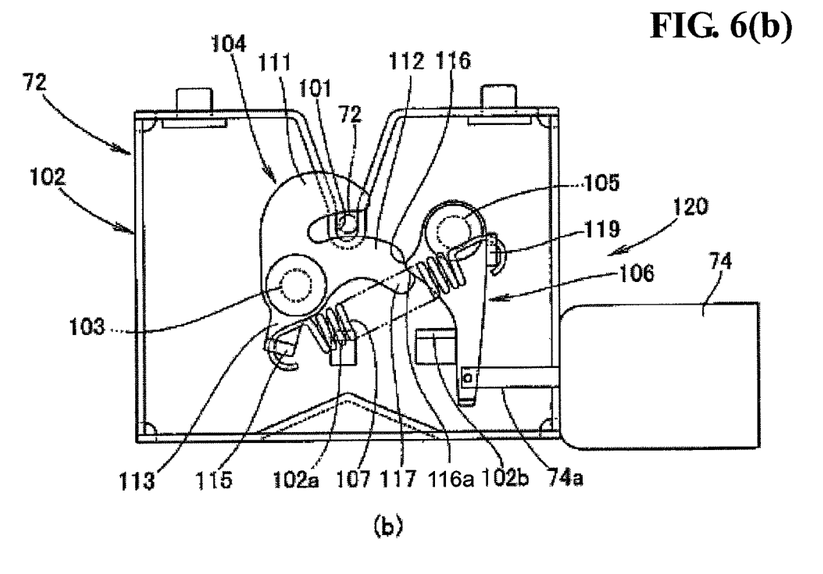

FIGS. 6A and 6B are front views of the catch mechanism according to an embodiment of the present invention. FIG. 6A shows a state where the catch mechanism 73 and the lock pin 72 are not coupled. The catch mechanism 73 includes a housing 102, having a U-shaped groove 101. The catch mechanism 73 also includes a locking claw 104 attached rotatably to the housing 102 with a pin 103. In addition, the catch mechanism 73 includes a stopper member 106 attached rotatably to the housing 102 with a pin 105 so as to hold the locking claw 104 in the locking position. Moreover, the catch mechanism 73 includes a tensile coil spring 107. The tensile coil spring 107 has a first and a second ends hooked respectively to the locking claw 104 and the stopper member 106, and thus pulls the locking claw 104 to the unlocking side while pulling the stopper member 106 to rotate in the clockwise direction. FIG. 6A also shows upstanding portions 102a and 102b. The upstanding portions 102a and 102b are obtained by raising parts of the housing 102, and restrict the rotation of the locking claw 104 and the stopper member 106, respectively.

The locking claw 104 is formed substantially in an "F" shape by an upper claw 111 and a lower claw 112, and is a member equipped with a spring stopper 115 in a lower arm portion 113 thereof. A first end of the tensile coil spring 107 is hooked to the lower arm portion 113.

The stopper member 106 includes a peaked portion 116 and an inclined portion 116a. The inclined portion 116a is formed in the peaked portion 116, and is designed to contact a lower projecting portion 117 formed in the lower claw 112 of the locking claw 104. The stopper member 106 also includes a spring stopper 119. The second end of the tensile coil spring 107 is hooked to the spring stopper 119. When the lower claw 112 of the locking claw 104 is pushed down with the lock pin 72, which is attached to the locking arm 71 (see FIG. 4), the locking claw 104 is caused to rotate to the locking side.

FIG. 6B shows a state where the catch mechanism 73 and the lock pin 72 are coupled. In this state, the inclined portion 116a of the stopper member 106 contacts the lower projecting portion 117 of the locking claw 104.

The inclined portion 116a of the stopper member 106 serves as a stopper, and the rotation of the locking claw 104 in the anti-clockwise direction is restricted. In this case, the locking claw 104 is engaged with the lock pin 72 in the catch mechanism 73. In other words, the steering is locked.

If the actuator 74 is operated to draw a rod 74a into the actuator 74, the stopper member 106 is caused to rotate so that the steering lock is released. The actuator 74 and the stopper member 106 are components of an unlocking mechanism 120 for releasing the steering lock.

Figure 7A:
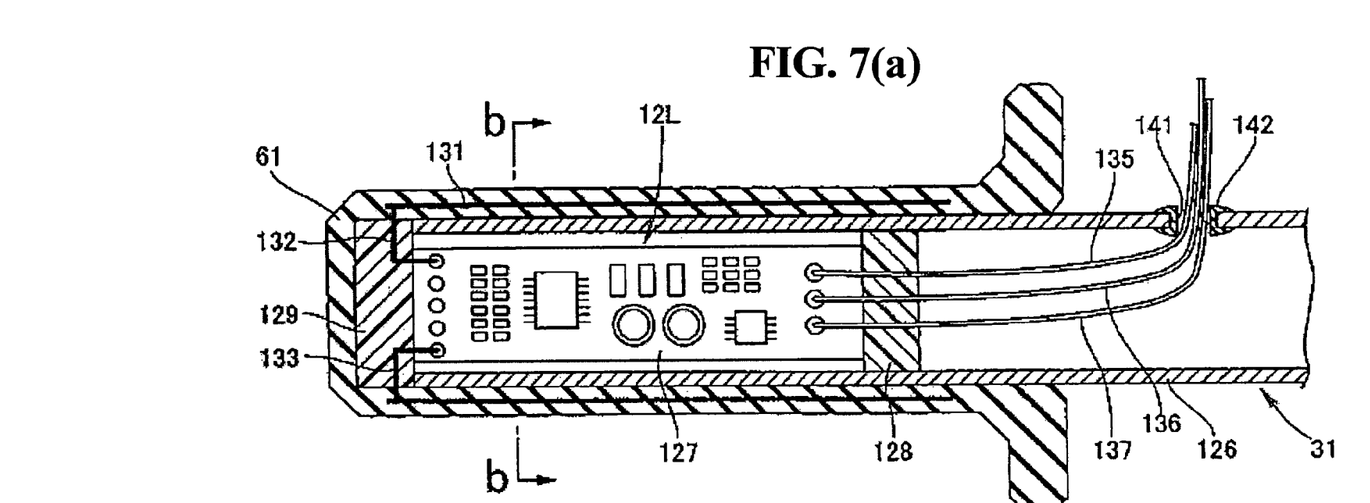
FIGS. 7A and 7B are cross-sectional views of a left grip according to an embodiment of the present invention.
Figure 7B:
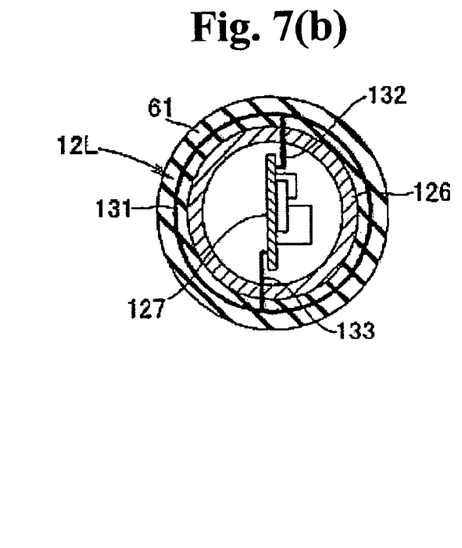

FIGS. 7A and 7B are cross-sectional views of the left grip according to an embodiment of the present invention. FIG. 7A is a longitudinal sectional view of the left grip 61, and shows that an approach sensor 12L (here, approach sensor 12 is referred to as the approach sensor 12L) is disposed inside the rubber left grip 61.

The approach sensor 12L is a capacitance type sensor, and includes a sensor board 127. The sensor board 127 is inserted into an end portion of a pipe member 126 that constitutes the handlebar 31. The approach sensor 12L also includes a supporting member 128 disposed inside the pipe member 126, and a supporting member 129 disposed between the pipe member 126 and the left grip 61. The supporting members 128 and 129 are designed to support the two ends of the sensor board 127. In addition, the approach sensor 12L includes an electrode 131 embedded in the left grip 61, and also includes two wires 132 and 133 connecting the electrode 131 to the sensor board 127.

The sensor board 127 is connected to the control unit 16 (see FIG. 1) via three wires 135 to 137. A through hole 141 is formed in the pipe member 126, for drawing the wires 135 to 137 from the inside of the pipe member 126 to the outside thereof. A rubber grommet 142 is fitted to the through hole 141.

FIG. 7B is a cross-sectional view taken along the line b-b of FIG. 7A. FIG. 7B shows that the electrode 131 is a tubular member disposed concentrically with the pipe member 126 and the left grip 61. When the rider grips the left grip 61 with his/her hand, a predetermined distance between the hand and the electrode 131 is maintained. The capacitance changes between before and after gripping the left grip 61. This change in capacitance is transmitted as a detection signal to the control unit 16.

Figure 8A:
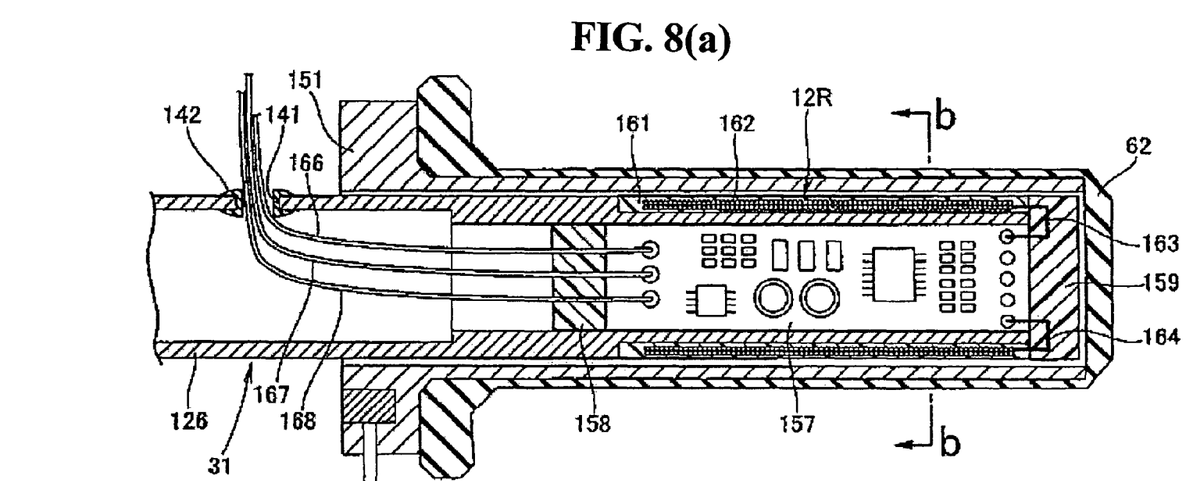
FIGS. 8A and 8B are cross-sectional views of a right grip according to an embodiment of the present invention.
Figure 8B:
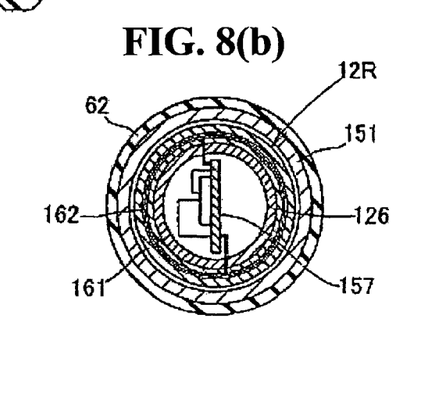

FIGS. 8A and 8B are cross-sectional views of the right grip according to an embodiment of the present invention. FIG. 8A is a longitudinal sectional view of the right grip 62, and shows that an approach sensor 12R (here, approach sensor 12 is referred to as approach sensor 12R) is disposed inside the rubber right grip 62.

The grip 62 is fitted onto a tubular grip supporting member 151. The tubular grip supporting member 151 is attached rotatably to the pipe member 126. A first end of a throttle cable 152 is connected to this grip supporting member 151 while a second end of the throttle cable 152 is connected to the throttle-valve side.

The approach sensor 12R is an inductance type sensor. The approach sensor 12R further includes a sensor board 157. To support the two ends of the sensor board 157, a supporting member 158 is disposed inside the pipe member 126, and a supporting member 159 is disposed between the pipe member 126 and the right grip 62. In addition, the approach sensor 12R includes a coil 162 embedded in a tubular member 161. The tubular member 161 is made of a resin, and is fitted onto an end portion of the pipe member 126. Two wires 163 and 164 connecting the coil 162 to the sensor board 157 are also included in the approach sensor 12R. Furthermore, three wires 166 to 168 connect the sensor board 157 to the control unit 16 (see FIG. 1).

FIG. 8B is a cross-sectional view taken along the line b-b of FIG. 8A. The coil 162 is disposed concentrically with the pipe member 126 and the right grip 62. When the rider grips the right grip 62 with his/her hand, the inductance of the electrified coil 162 changes from the inductance in the state where the rider does not grip the right grip 62. The change in inductance is transmitted as a detection signal to the control unit 16.

Figure 9A:
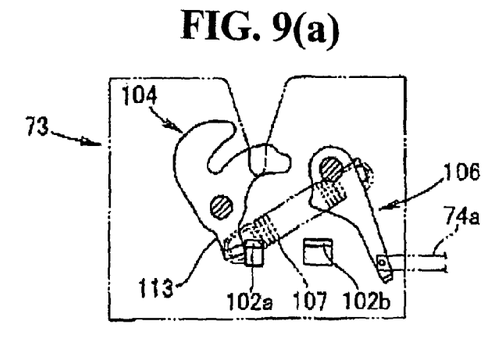
FIGS. 9A to 9D are first operational diagrams showing an operation of the locking mechanism according to an embodiment of the present invention.

The operation of the above-mentioned locking mechanism 17 will be explained below. FIGS. 9A to 9D are first operational diagrams showing how the locking mechanism of the present invention operates. FIG. 9A shows a state in which the steering is not locked. Assuming that a rider carrying the portable key 11 approaches the motorcycle 30 that is not running, and holds the grips 61 and 62 before locking the steering with the steering lock device 10, in the catch mechanism 73, the lower arm portion 113 of the locking claw 104 is in a position where the lower arm portion 113 may contact the upstanding portion 102a. Meanwhile, the stopper member 106 is drawn by the actuator 74 (see also FIG. 6A), to be in a position where the stopper member 106 may not interfere with the clockwise rotation of the locking claw 104. This shows the steering in an unlocked state.

Figure 9B:
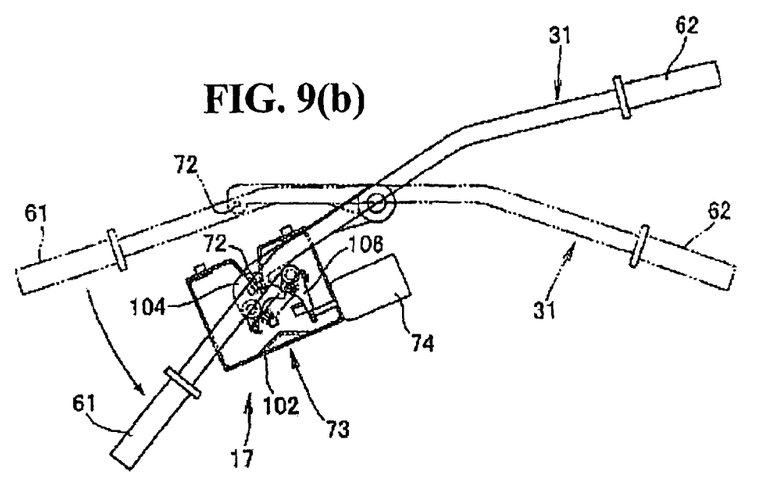
Figure 9C:
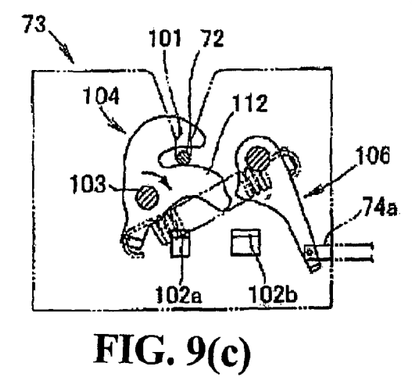

Assuming that the handlebar 31 is steered to the left to the maximum steerable extent, from the unlocked state, as in FIG. 9B, the lock pin 72 of the locking mechanism 17 pushes down the locking claw 104 of the catch mechanism 73. FIG. 9C is an enlarged view of the catch mechanism 73 of FIG. 9B. The lock pin 72 pushes down the lower claw 112 of the locking claw 104. Therefore, the locking claw 104 rotates in the direction indicated by the arrow until the lock pin 72 contacts the bottom of the U-shaped groove 101 of the housing 102. In other words, steering the handlebar 31 to the left to the steerable maximum extent is equivalent of bringing the lock pin 72 into contact with the bottom of the U-shaped groove 101.

At this time, the stopper member 106 maintains the position thereof as in FIG. 9A, and is away from the locking claw 104. Here, the lock pin 72 and the catch mechanism 73 are not yet coupled. This is the state in which the steering lock is possible, that is, the steering-lock stand-by state.

Figure 9D:
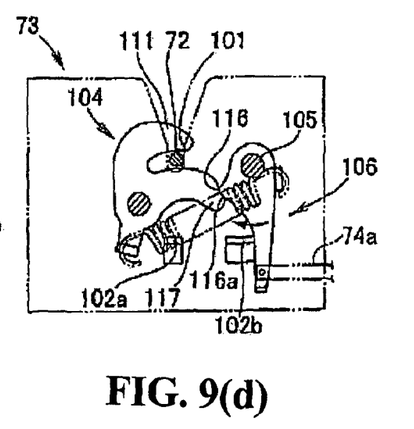

Assuming that the rider moves a predetermined distance away from the motorcycle 30 while the locking mechanism 17 being in the above-mentioned state, the communications between the portable key 11 and the control unit 16 of the locking mechanism 17 are no longer possible. Since the portable key 11 can no longer be verified, as shown in FIG. 9D, the actuator 74 is operated to rotate the stopper member 106 about the pin 105 in the direction indicated by the arrow. Thereafter, the rotation of the stopper member 106 stops, when the stopper member 106 is brought into contact with the upstanding portion 102b (see also FIG. 6A). In this state, the inclined portion 116a of the peaked portion 116 in the stopper member 106 hits against the lower projecting portion 117 of the locking claw 104. Hence, the stopper member 106 blocks the rotating movement of the locking claw 104. Accordingly, the lock pin 72 cannot be removed from the U-shaped groove 101 because of the upper claw 111 of the locking claw 104. This shows the steering locked state.

Incidentally, when the portable key can no longer be verified, neither can the verification process between the control unit 16 and the ECU 21. As a consequence, the ignition device and the fuel injection device of the engine 22 are disabled.

The above-described steering lock device 10 of the present invention is compared with a conventional-type steering lock device as described hereinbelow. Locking the steering in a conventional steering lock device requires the main switch to be turned to the lock position after steering the handlebar to a predetermined position. Unlike conventional steering lock device, the rider takes less trouble to lock the steering when he/she uses the steering lock device 10 of the illustrated embodiment than the conventional one because the action of turning the main switch to the lock position is not required.

Referring to FIGS. 1 to 3, assuming that a rider carrying the portable key 11 approaches the motorcycle 30, and the approach sensor 12 (approach sensor 12L, 12R) detects that at least one of the left and right grips 61 and 62 is held, the control unit 16 is activated and communications between the control unit 16 and the portable key 11 start (smart communication).

More specifically, the control unit 16 transmits a request signal as the transmission signal ST to the portable key 11 via the transmitting unit 13. Upon receipt of the request signal, the portable key 11 transmits an identification code as the portable transmission signal SPT to the control unit 16 via the receiving unit 14.

Upon receiving the portable transmission signal SPT, the control unit 16 checks the identification code with the reference code stored in the control unit 16 (verification process). When the identification code matches the reference code, the control unit 16 causes the locking mechanism 17 to release the steering lock.

Moreover, the control unit 16 transmits an identification code signal SID as the identification signal to the ECU 21. Meanwhile, the ECU 21 transmits, to the control unit 16, the information such as an engine revolution speed Ne, a throttle position θth, an intake manifold air pressure, and a vehicle speed Vs detected by the vehicle speed sensor 23. When the ECU 21 starts, the control unit 16 checks the above-mentioned identification signal with the reference signal. If the identification signal matches the reference signal, the ignition device and the fuel injection device of the engine 22 are set to an operable state.

Figure 10A:
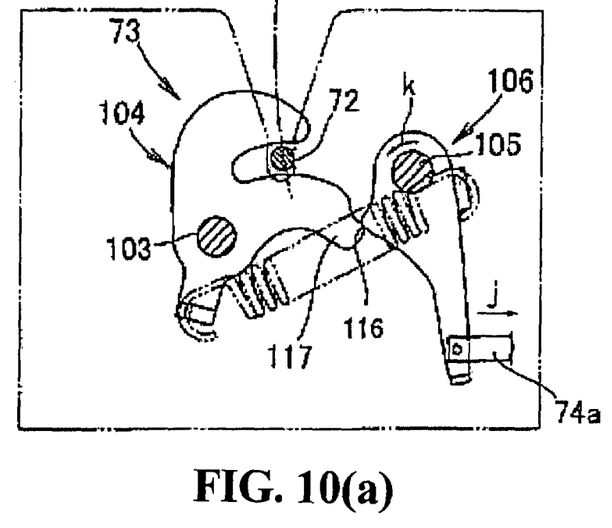
FIGS. 10A and 10B are second operational diagrams showing an operation of the locking mechanism according to an embodiment of the present invention.
Figure 10B:
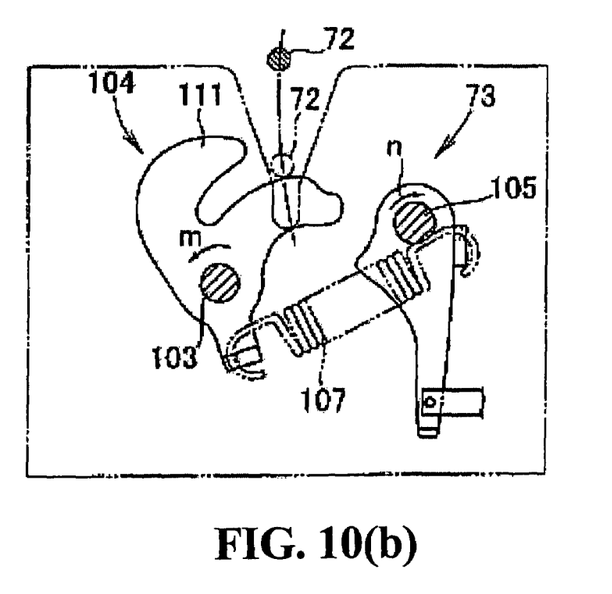

FIGS. 10A and 10B are second operational diagrams showing how the locking mechanism according to an embodiment of the present invention operates. Explanations will be provided below for the steering lock releasing operation of the locking mechanism 17. As shown in FIG. 9D, the steering is locked. Referring to FIG. 10A, assuming that the lock pin 72 and the catch mechanism 73 have to be unlocked, that is, the steering lock has to be released, the actuator 74 is activated to draw the rod 74a thereof in the direction of the arrow j. The stopper member 106 is then rotated in the direction of the arrow k. Consequently, the peaked portion 116 of the stopper member 106 moves downward, and passes over the lower projecting portion 117 of the locking claw 104. The locking claw 104 is then rotated in the direction of the arrow m by the tensile force of the tensile coil spring 107 as shown in FIG. 10B. In this way, the lock pin 72 is released from the upper claw 111 of the locking claw 104. The lock pin 72 and the catch mechanism 73 do no longer engage with each other. Therefore, the steering lock is released.

The stopper member 106, on the other hand, returns to the position where the stopper member 106 hits against the upstanding portion 102b (see FIG. 6A). Specifically, when the main switch is turned off, the control unit 16 stops as electric power supply is cut off. Therefore, the drawing of the rod 74a by the actuator 74 is relaxed, so that the stopper member 106 rotates in the direction of the arrow n. This is how the stopper member 106 returns to the above-mentioned position.

Figure 11:
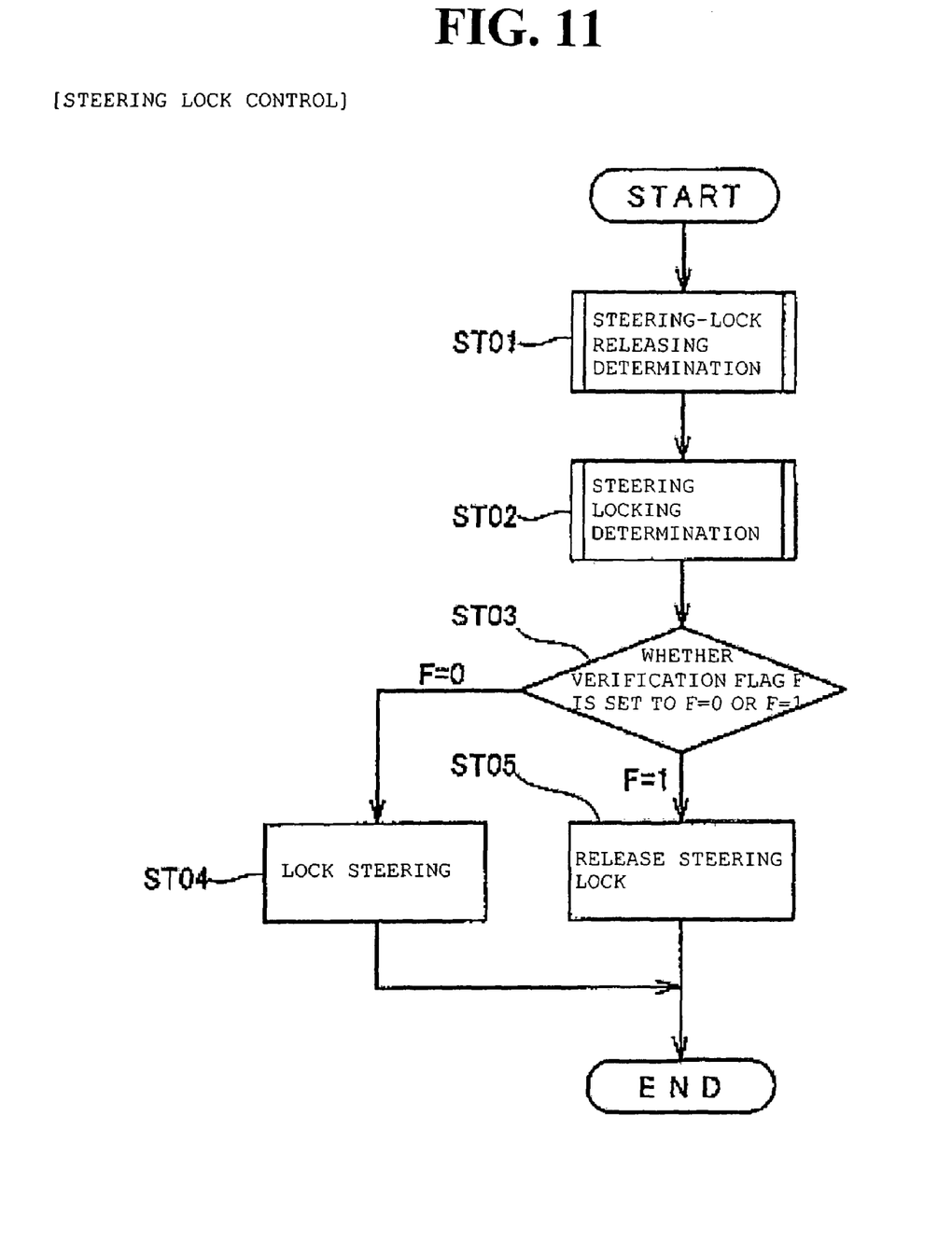
FIG. 11 is a flowchart showing the flow of steering-lock control according to an embodiment of the present invention.

FIG. 11 is a flow chart of the steering lock control according to an embodiment of the present invention, and shows the flow of control including the locking, and the unlocking, of the steering. In step ST01, a steering-lock releasing determination process is performed (detailed description of this step will be described with reference to FIG. 12). In step ST02, a steering locking determination process is performed (detailed description of this step will be described with reference to FIG. 13.)

In step ST03, it determines whether verification flag is set to F=0 or F=1. If F=0, the process proceeds to step ST04. If F=1, the process proceeds to step ST05. In step ST04, the steering lock device is locked. In step ST05, the steering lock device is unlocked.

Figure 12:
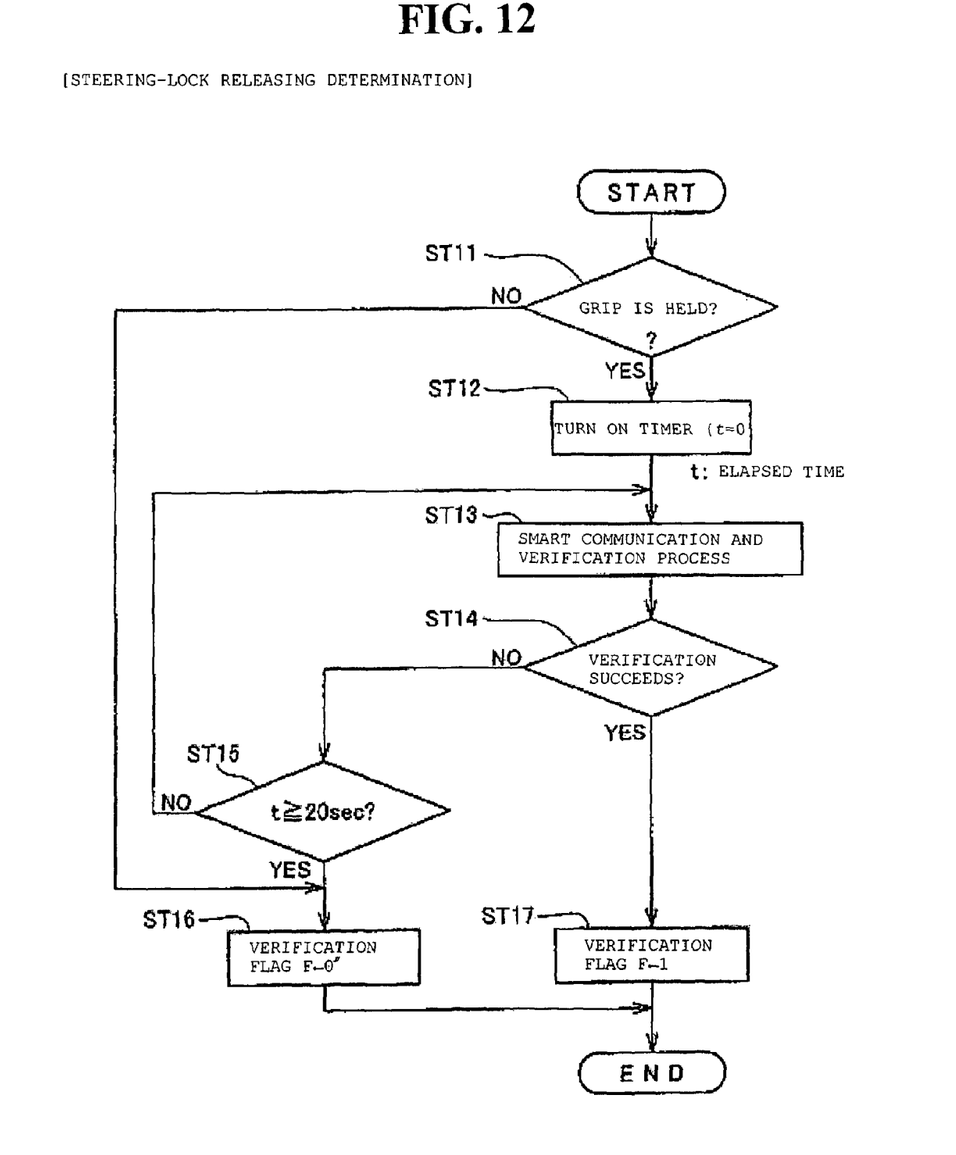
FIG. 12 is a flowchart showing the flow of a steering-lock releasing determination process according to an embodiment of the present invention.

FIG. 12 is a flow chart of the steering-lock releasing determination process according to an embodiment of the present invention. In step ST11, it determines whether the grip of the handlebar is held. If the grip is held (YES), the process proceeds to step ST12. If the grip is not held (NO), the process proceeds to step ST16.

In step ST12, the timer is turned on, and the elapsed time t starts from zero (0). In step ST13, the verification process is performed by communications between the portable key and the control unit (smart communication). In step ST14, it determines whether the identification code of the portable key is verified. If the code is not verified (NO), the process proceeds to step ST15. If the code is verified (YES), the process proceeds to step ST17.

In step ST15, it determines whether the elapsed time t is not less than 20 seconds. If the elapsed time t is less than 20 seconds, that is, t<20 sec, the process proceeds to step ST13. If the elapsed time t is not less than 20 seconds, that is, t≧20 sec, the process proceeds to step ST16. In step ST16, the verification flag F is set to be 0. In step ST17, the verification flag F is set to be 1.

Figure 13:
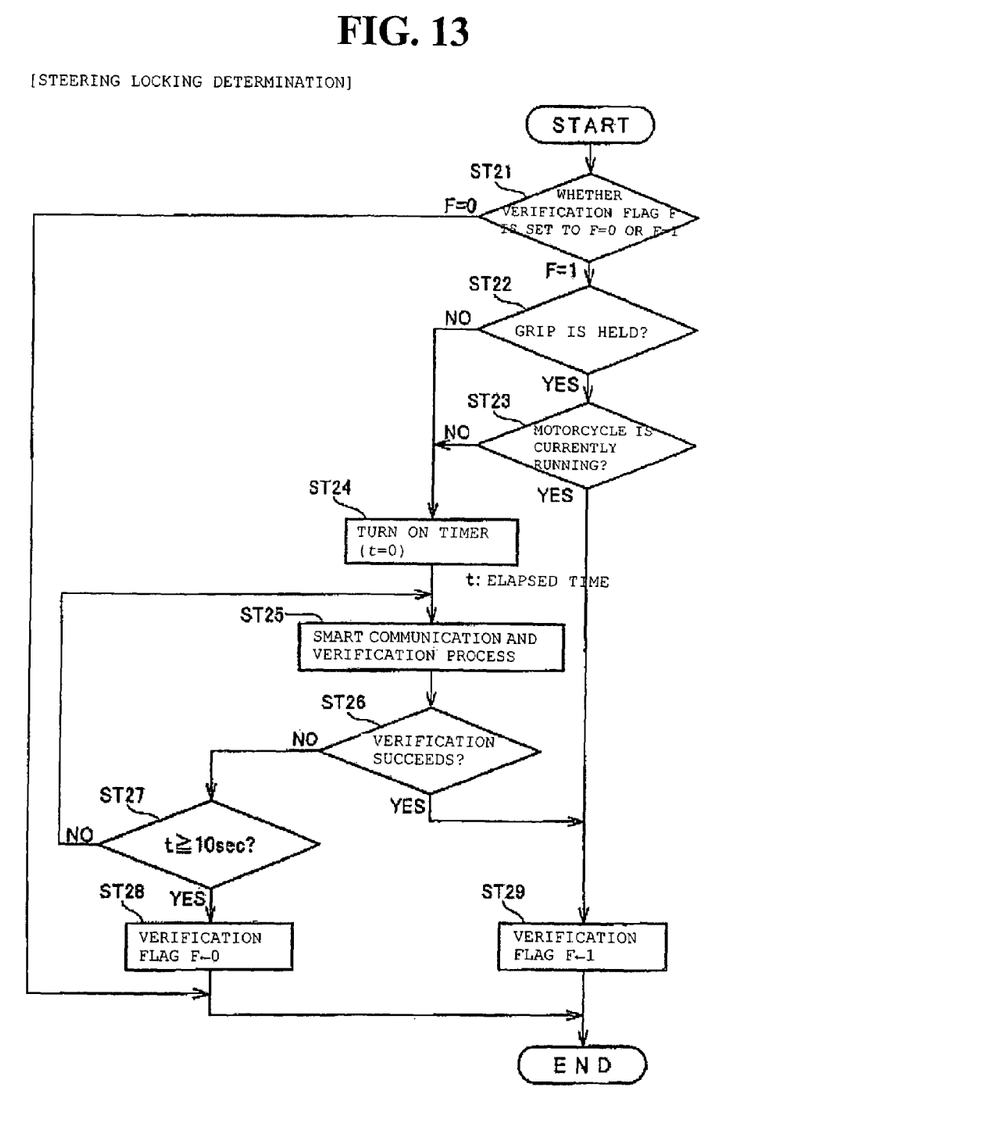
FIG. 13 is a flowchart showing the flow of a steering locking determination process according to an embodiment of the present invention.

FIG. 13 is a flowchart of the steering locking determination process according to an embodiment of the present invention. In step ST21, it determines whether the verification flag is set to F=0 or F=1. If F=0, the process is terminated. If F=1, the process proceeds to step ST22.

In step ST22, it determines whether the grip of the handlebar is held. If the grip is held (YES), the process proceeds to step ST23. If the grip is not held (NO), the process proceeds to step ST24.

In step ST23, it determines whether the motorcycle is currently running. If the motorcycle is not currently running, (NO), the process proceeds to step ST24. If the motorcycle is currently running (YES), the process proceeds to step ST29.

In step ST24, the timer is turned on, and the elapsed time t starts from zero (0). In step ST25, the verification process is performed by communications between the portable key and the control unit (smart communication). In step ST26, it determines whether the identification code of the portable key is verified. If the code is not verified (NO), the process proceeds to step ST27. If the code is verified (YES), the process proceeds to step ST29.

In step ST27, it determines whether the elapsed time t is not less than 10 seconds. If the elapsed time t is less than 10 seconds, that is, t<10 sec, the process proceeds to step ST25. If the elapsed time t is not less than 10 seconds, that is, t≧10(sec), the process proceeds to step ST28. In step ST28, the verification flag F is set to be 0. In step ST29, the verification flag F is set to be 1.

As have been shown in FIGS. 4, 6A and 6B, the steering lock device 10 is provided with the catch mechanism 73. The catch mechanism 73 includes: the handlebar 31 attached to the steering stem 65; the locking arm 71 attached to this handlebar 31 and equipped with the lock pin 72 for engagement on the tip end portion thereof; and the locking claw 104 serving as an engaging portion, which is engagable with the lock pin 72, and is usually biased in the unlocking direction. In this catch mechanism 73, the locking claw 104 is disposed on the rotation track of the lock pin 72. Accordingly, when external force is applied from the lock pin 72 contacting the locking claw 104 of the catch mechanism 73, the locking claw 104 is moved in the locking direction. As a consequence, the steering-lock stand-by state in which the locking claw 104 can be engaged with the lock pin 72 is accomplished.

In this way, a steering-lock stand-by state can be accomplished by merely steering the handlebar 31 to the steerable maximum extent, and steering can be locked with ease. Moreover, the attachment position of the catch mechanism 73 needs to be controlled accurately only in the radial direction of the rotation track of the lock pin 72, and no comparable accuracy is required in the axial direction of the lock pin 72. Accordingly, the steering lock device can be developed with lower cost.

In addition, the locking arm 71 is attached to the steering stem 65, which supports the handlebar 31, so that the locking arm 71 can extend outwards. Hence, the locking arm 71 has a shorter total length, and the catch mechanism 73 has a narrower mounting tolerance, which is related to the total length of the locking arm 71.

Furthermore, as shown in FIGS. 1, 6A and 6B, the catch mechanism 73 includes the unlocking mechanism 120, and that the steering lock device 10 includes the control unit 16. In addition, the unlocking mechanism 120 is equipped with the actuator 74 and the stopper member 106 so as to release the engagement of the lock pin 72 and the locking claw 104. The control unit 16 causes an identity verification process for releasing the steering lock to be performed between the steering lock device 10 and the portable key 11 carried by the rider. According to the result of verification, the control unit 16 then causes the unlocking mechanism 120 to perform the unlocking operation. By employing this structure, the control unit 16 alone can perform the identity verification process and can release the steering lock easily. For example, the rider does not have to carry out any operation for releasing the steering lock.

It should be noted that in the embodiment illustrated in FIGS. 9A to 9D, the steering-lock stand-by state is assumed to be accomplished when the handlebar is steered to the left to the maximum steerable extent. Then, the stopper member 106 of the catch mechanism 73 has to be drawn by the actuator 74 in order to lock the steering. Alternatively, instead of drawing the stopper member 106 by the actuator 74, the handlebar 31 may be steered to the left to the maximum steerable extent with the stopper member 106 being kept in the state of contacting the upstanding portion 102b in order to make the lock pin 72 be engaged with the catch mechanism 73, that is, in order to lock the steering.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering lock device of a motorcycle comprising:
a steering catch mechanism including:
a steering handlebar attached to a steering stem;
a steering locking arm extending directly and radially outwardly from the steering stem, the steering locking arm being equipped with a pin on a tip end portion of the steering locking arm for engagement, the steering locking arm pivoting on the steering stem when steering handlebar is steered; and
an engaging portion for engagement with the pin and biased in an unlocking direction, the engaging portion being disposed on a rotation track of the pin,
wherein when external force is applied to the pin such that the pin is brought into contact with the engaging portion of the steering catch mechanism, the engaging portion moves in a locking direction to be in a steering-lock stand-by state, the engaging portion being engaged with the pin in the steering-lock stand-by state.

2. The steering lock device of claim 1 wherein the steering locking arm is attached to and extends outward from the steering stem that supports the steering handlebar.

3. The steering lock device of claim 2, wherein the steering catch mechanism is equipped with an unlocking mechanism for releasing the engagement of the pin and the engaging portion, the steering lock device further including a control unit to perform an identity verification process with a portable key, and to cause the unlocking mechanism to perform an unlocking operation according to the verification result.

4. The steering lock device of claim 3, wherein the steering catch mechanism further includes a stopper, when the identity verification process is unsuccessful, the stopper rotating to block a rotating movement of the engaging portion to prevent the pin from being disengaged with the engaging portion, such that the steering catch mechanism enters from the steering-lock stand-by state into a steering locked state.

5. The steering lock device of claim 1, wherein the steering catch mechanism is equipped with an unlocking mechanism for releasing the engagement of the pin and the engaging portion, the steering lock device further including a control unit to perform an identity verification process with a portable key, and to cause the unlocking mechanism to perform an unlocking operation according to the verification result.

6. The steering lock device of claim 1, wherein the steering catch mechanism further includes a stopper, when an identity verification process is unsuccessful, the stopper rotating to block a rotating movement of the engaging portion to prevent the pin from being disengaged with the engaging portion, such that the steering catch mechanism enters from the steering-lock stand-by state into a steering locked state.

7. The steering lock device of claim 1, wherein the the engaging portion has a groove, the pin enters into the groove of the engaging portion in the steering-lock stand-by state, and the rest of steering locking arm is outside of the groove of the engaging portion in the steering-lock stand-by state.

8. The steering lock device of claim 7, wherein the pin enters into the groove of the engaging portion when the steering handlebar is steered in one of a clockwise direction and a counterclockwise direction to the steerable maximum extent.

9. The steering lock device of claim 1, wherein the pin moves along the rotation track when the steering handlebar is steered in one of a clockwise direction and a counterclockwise direction, when the pin is in contact with the engaging portion, the pin rotating the engaging portion until the steering handlebar is steered to the steerable maximum extent.

10. The steering lock device of claim 1, wherein the steering catch mechanism further includes a spring biasing the engaging portion in the unlocking direction, the spring being spaced apart from a rotation shaft to the engaging portion.

11. The steering lock device of claim 10, wherein the engaging portion has a locking claw at a first free end thereof and a lower arm at a second free end thereof, and a first end of the spring is hooked to the a lower arm at a second free end of the engaging portion.

12. The steering lock device of claim 11, wherein the steering catch mechanism further includes a rotatable stopper, a second end of the spring being hooked to the rotatable stopper, the rotatable stopper engaging with the locking claw to block a rotating movement of the engaging portion, thereby preventing the pin from being disengaged with the engaging portion in a steering locked state.

13. The steering lock device of claim 1, wherein the steering catch mechanism further includes a rotatable stopper, the rotatable stopper blocking a rotating movement of the engaging portion to prevent the pin from being disengaged with the engaging portion in a steering locked state.

14. The steering lock device of claim 1, wherein the steering locking arm is located below a head pipe on the steering stem.

15. A steering lock device of a motorcycle comprising:
a steering catch mechanism including:
a steering handlebar attached to a steering stem;
a steering locking arm directly extending radially outwardly from the steering stem, the steering locking arm being equipped with a pin, the steering locking arm pivoting on the steering stem when steering handlebar is steered; and
an engaging portion biased in a an unlocking direction, wherein when the steering handlebar is steered to a predetermined degree, the pin is brought into contact with the engaging portion of the steering catch mechanism to move the engaging portion to a locking direction such that the steering catch mechanism enters into a steering-lock stand-by state, the engaging portion being engaged with the pin in the steering-lock stand-by state.

16. The steering lock device of claim 15, further comprising
a control unit to perform an identity verification process,
wherein the steering catch mechanism further includes a stopper, when the identity verification process is unsuccessful, the stopper rotating to block a rotating movement of the engaging portion to prevent the pin from being disengaged with the engaging portion, such that the steering catch mechanism enters from the steering-lock stand-by state into a steering locked state.

17. The steering lock device of claim 16, wherein the steering catch mechanism is equipped with an unlocking mechanism for disengaging the pin from the engaging portion, the control unit causing the unlocking mechanism to perform an unlocking operation when the identity verification process is successful.

18. The steering lock device of claim 15, wherein the engaging portion has a groove, the pin enters into the groove of the engaging portion in the steering-lock stand-by state, and the rest of steering locking arm is outside of the groove of the engaging portion in the steering-lock stand-by state.

19. The steering lock device of claim 18, wherein the pin enters into the groove of the engaging portion when the steering handlebar is steered in one of a clockwise direction and a counterclockwise direction to the steerable maximum extent.

20. The steering lock device of claim 15, wherein the pin moves along the rotation track when the steering handlebar is steered in one of a clockwise direction and a counterclockwise direction, when the pin is in contact with the engaging portion, the pin rotating the engaging portion until the steering handlebar is steered to the steerable maximum extent.

21. The steering lock device of claim 15, wherein the steering catch mechanism further includes a spring biasing the engaging portion in the unlocking direction, the spring being spaced apart from a rotation shaft to the engaging portion.

22. The steering lock device of claim 21, wherein the engaging portion has a locking claw at a first free end thereof and a lower arm at a second free end thereof, and a first end of the spring is hooked to the a lower arm at a second free end of the engaging portion.

23. The steering lock device of claim 22, wherein the steering catch mechanism further includes a rotatable stopper, a second end of the spring being hooked to the rotatable stopper, the rotatable stopper engaging with the locking claw to block a rotating movement of the engaging portion, thereby preventing the pin from being disengaged with the engaging portion in a steering locked state.

24. The steering lock device of claim 15, wherein the steering catch mechanism further includes a rotatable stopper, the rotatable stopper blocking a rotating movement of the engaging portion to prevent the pin from being disengaged with the engaging portion in a steering locked state.

25. The steering lock device of claim 15, wherein the steering locking arm is located below a head pipe on the steering stem.

* * * * *